United States Patent [19]

Noguchi et al.

[11] 3,901,197

[45] Aug. 26, 1975

[54] METHOD AND DEVICE FOR REFORMING THE QUALITY OF FUEL OIL IN AN INTERNAL COMBUSTION ENGINE

[75] Inventors: Masaaki Noguchi, Nagoya; Masaharu Sumiyoshi, Toyota, both of Japan

[73] Assignee: Toyota Jidosha Kogyo Kabushiki Kaisha, Japan

[22] Filed: May 1, 1974

[21] Appl. No.: 466,028

[30] Foreign Application Priority Data
May 4, 1973   Japan.............................. 48-50156

[52] U.S. Cl. .................................... 123/3; 123/127
[51] Int. Cl.² ........................................ F02B 43/08
[58] Field of Search............ 123/119 E, 3, 1 A, 127, 123/119 R, 122 G; 48/DIG. 8, 219, 144, 203

[56] References Cited
UNITED STATES PATENTS

| | | | |
|---|---|---|---|
| 1,613,258 | 1/1927 | Woolson ......................... | 123/122 G |
| 2,225,647 | 12/1940 | Liekendael ..................... | 123/122 G |
| 3,171,395 | 3/1965 | Bartholomew..................... | 123/127 |
| 3,688,755 | 9/1972 | Grayson et al......................... | 123/3 |
| 3,828,736 | 8/1974 | Koch................................ | 123/1 A |

OTHER PUBLICATIONS

Carburetor with Spark Plug; a New Development for Vaporizing Kerosene, Scientific American, Nov. 17, 1917, pp. 368.

*Primary Examiner*—Charles J. Myhre
*Assistant Examiner*—James D. Liles
*Attorney, Agent, or Firm*—Oblon, Fisher, Spivak, McClelland & Maier

[57] ABSTRACT

A method and apparatus for supplying combustible material to an internal combustion engine including feeding a first portion of fuel and air to a reformer, diverting a part of the first portion into a separate path in the reformer, burning at least a portion of the part of the first portion of fuel and utilizing the heat to heat up and vaporize the remaining part of the first portion of fuel to reform it into a mixture of decomposition and oxidation products, and introducing the mixture as well as a second portion of fuel and air into a combustion chamber.

8 Claims, 6 Drawing Figures

METHOD AND DEVICE FOR REFORMING THE QUALITY OF FUEL OIL IN AN INTERNAL COMBUSTION ENGINE

CROSS-REFERENCE TO RELATED APPLICATIONS

This application is an improvement of U.S. Pat. application Ser. No. 430,650 filed Jan. 4, 1974, for "INTERNAL COMBUSTION ENGINE" which was invented by the applicants of this improved application and others, said applications being commonly owned by the same assignee.

BACKGROUND OF THE INVENTION

The present invention relates generally to internal combustion engines and the supplying of fuel thereto, and more particularly to a method and a device for reforming the quality of hydrocarbon fuel oil to be supplied to the internal combustion engine and thereby improving the fuel efficiency and other properties, as well as removing some of the harmful contents from the emission gases. More specifically, a method and a device are provided for reforming the fuel oil supply through heating of the fuel supply by burning one part of the same and by reacting the burnt part and the rest as well with a catalyst.

In internal combustion engines burning hydrocarbon fuel oil, no attempts have heretofore been made to supply a fuel oil of reformed quality to the cylinder. The present invention has been worked out with the view in mind that the ignition and combustion in an internal combustion engine can be secured with an improved efficiency of burning when a mixture of the products of decomposition and oxidation with various contents is obtained by treating a part of the hydrocarbon fuel oil supply in the presence of oxygen and supplying the same thereafter to the cylinders of the engine.

SUMMARY OF THE INVENTION

A primary object of the present invention therefore is to provide a method for improving the fuel efficiency of an internal combustion engine while reducing harmful contents from the exhaust gases thereof.

An object of the present invention therefore is to provide a method of reforming at least a part of the supply fuel for an internal combustion engine into a mixture of the products of decomposition and oxidation to achieve increased efficiency and simultaneously to reduce the amount of harmful contents in the emission gas thereof.

Another object of the present invention is to provide an apparatus for performing the method of reforming a part of the fuel being supplied to an internal combustion engine into a mixture of the products of decomposition and oxidation.

The foregoing objects and others are achieved according to this invention by reforming a part of the supply fuel flowing to an internal combustion engine into a mixture of the products of decomposition and oxidation and supplying this mixture together with the main fuel supply being fed to the cylinders of the engine. More particularly, this is achieved by providing a sub-path separate from the main fuel path leading from the fuel tank to the cylinder, which subpath consists of a first path and a second path, sending the greater part of the fuel through the first path, diverting the remaining part of the fuel mixture into the second path where it is ignited and burned, heating and vaporizing the mixture flowing in the first path by the heat of the burned mixture in the second path, and then sending a blend of the fuel gases in both paths and air to a catalyzer.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and in which.

DETAILED DESCRIPTION OF A PREFERRED EMBODIMENT

Figure 1:
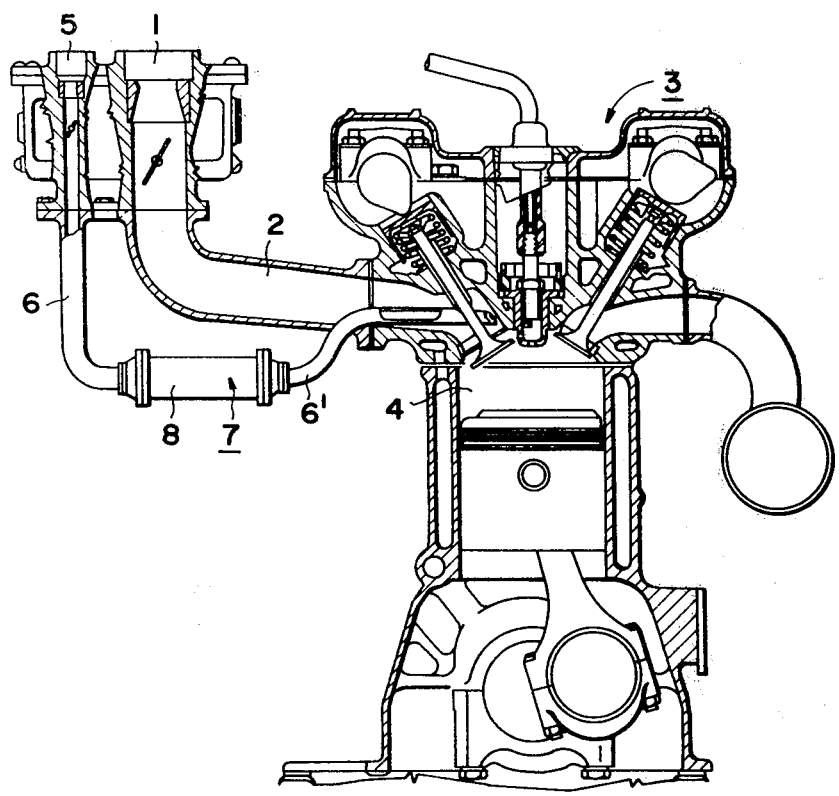
FIG. 1 is a schematic diagram showing a longitudinal section of an internal combustion engine equipped with the embodiment of the present invention.
Figure 2A:
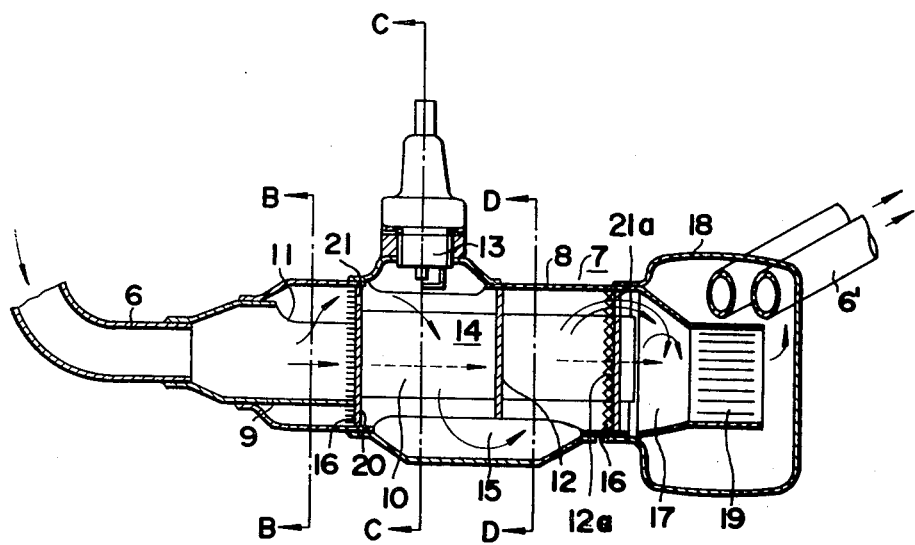
FIG. 2A is an enlarged longitudinal sectional view of the embodiment of the present invention shown in FIG. 1.
Figure 2B:
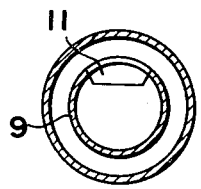
FIG. 2B is a cross-sectional view taken on line B—B of FIG. 2A.
Figure 2C:
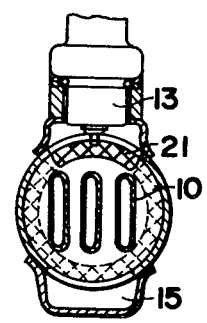
FIG. 2C is a cross-sectional view taken on line C—C of FIG. 2A.
Figure 2D:
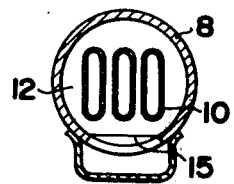
FIG. 2D is a cross-sectional view of line D—D of FIG. 2A.

Referring now to the drawings, and more particularly to FIG. 1 thereof, there is shown an internal combustion engine equipped with the device of the present invention. In the conventional manner, the mixture to be sucked or drawn into a combustion chamber defined by a cylinder 4 is prepared by a carburetor 1, where the fuel is mixed with air. A part of the fuel from the fuel tank, now shown, however, is diverted midway along its path, so that instead of passing through the main suction manifold 2, which is the main path for most of the fuel from the main carburetor 1, and then into the combustion chamber of cylinder 4 of the internal combustion engine 3, it goes from an auxiliary carburetor 5 and through an auxiliary suction pipe 6, which is a sub-path, to an fuel reformer 7 of the present invention where this part of the fuel is first reformed before being supplied to the combustion chamber of the cylinder 4 through another part of the auxiliary suction pipe designated by the reference character 6'.

Figure 3:
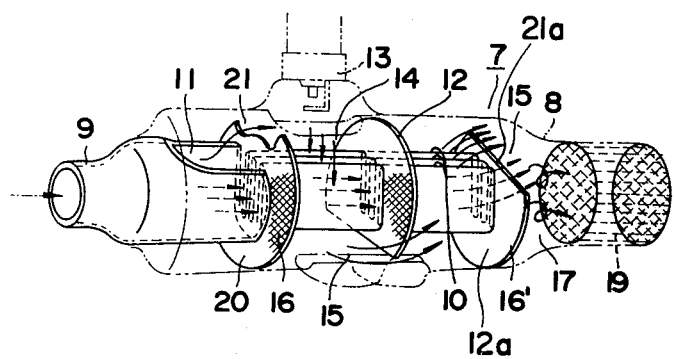
FIG. 3 is an oblique diagrammatic view illustrating the essential parts of the device shown in FIG. 2.

Turning now to FIGS. 2 and 3 for a more detailed study of the fuel reformer 7, an outer tube 8 thereof houses an inner tube 9 at one end, which is connected to the auxiliary suction pipe 6, and a number of heat-conducting pipes 10, which communicate with the inner end of the inner tube 9. On one part of the top periphery at the inner end of the inner tube 9 a notch 11 is provided which communicates with the reformer combustion chamber 14 through an opening 21 in a transverse partition plate 20 disposed adjacent the inner end of the inner tube 9 and constituting one wall of the reformer combustion chamber 14. The inside of the outer tube 8 is further divided into several sections by transverse partition walls 12, 12a disposed in parallel relation and spaced apart downstream of the partition plate 20. In one of these sections, there is disposed an igniter 13, shown as an electrode spark plug, although an electric heating wire may be used just as well. The partition walls defining the reformer combustion chamber 14 are provided with a passage 15, which communicates one section with another, thereby forming a by-path for the mixture which flows into the outer tube 8 via the notch 11 of the inner tube 9 and the opening 21 in plate 20. Metal screens 16, each supported by the partition plate 20 and partition wall 12a, are inserted in the reformer combustion chamber 14 so as to cover the openings 21 and 21a, which screens serve to prevent backfire into the inner tube 9 and ignition of the mixed gas coming out of the heat-conducting pipes 10.

A gap is formed between the heat-conducting pipes 10, which terminate in a mixing or plenum chamber 17 formed near one end of the outer tube 8 and which leads to a catalyst chamber 19 disposed within a casing 18 connected to the end of the outer tube 8. The casing 18 is connected to the auxiliary suction pipe or conduit 6' which opens into the entrance of the cylinder 4.

In the illustrated embodiment, the greater part of the mixture of air and fuel sucked into the cylinder goes from the main carburetor 1 through the main suction manifold 2 into the combustion chamber of cylinder 4. Meanwhile, a part of the mixture passes from the auxiliary carburetor 5 into the auxiliary suction pipe 6, and then via the fuel reformer 7, it also is sucked into the cylinder 4. The flow of mixture into the auxiliary suction pipe 6, which is a sub-path, is separated into a first path, which extends from the inner tube 9 via the heat-conducting pipes 10 to the mixing or plenum chamber 17, and into a second path, which extends from the notch 11 of the inner tube 9 through the opening 21 which leads to the reformer combustion chamber 14 set apart by the partition plate 20, then through the outer tube 8 via the reformer combustion chamber 14, and finally to the mixing chamber 17.

The mixture obtained in the auxiliary carburetor 5 has a preset mix ratio, but the fuel in the mixture is a blend of a vaporized gaseous phase and a liquid phase. The gaseous phase can uniformly mix with the air, but the liquid phase is partly sucked as droplets to be suspended in the air and partly becomes a liquid flow which spreads over the wall surface. The part of the mixture which has gone into the inner tube 9 that flows along the top periphery of the inner tube 9 becomes a relatively lean mixture with a larger proportion of the gaseous phase, while the part of the mixture which flows along the bottom periphery thereof becomes a relatively rich mixture having a larger proportion of the liquid phase. The former, or lean mixture, gets ignited and burns in the course of flowing through the opening 21 into the outer tube 8 and going through the reformer combustion chamber 14, and becomes a burnt gas, whereupon it passes through the sections divided by the partition walls 12, while at the same time heating the heat-conducting pipes 10, and then flows into the mixing chamber 17.

The latter, or rich mixture, goes through the heat-conducting pipes 10, where, being heated by the burnt gas, has its liquid phase vaporized into a gaseous phase, which then flows into a mixing chamber 17 to be blended with the burnt gas.

The burnt gas, even after having its heat exchanged with the heat-conducting pipes 10, is still so hot that even after vaporizing the mixture flowing in the heat-conducting pipes 10 by its heat, has a temperature higher than that of the mixture. Therefore, the temperature of the blend of the mixture and the burnt gas in the mixing chamber 17 as in the case where hot water is poured into cool water, will depend on the temperature and the proportion of hot water being poured, or in other words, on the air/fuel ratio and volume ratio of the lean mixture to be ignited and burned. Thus, an appropriate volume ratio can be attained by choosing an adequate ratio between the area of the opening 21 which leads from the notch 11 to the reformer combustion chamber 14 and the sum of the entrance areas of the heat-conducting pipes 10, because the negative pressures created in the engines act in the same manner. As for the air/fuel ratio, since the mixture is a lean one with a larger proportion of gaseous phase, as mentioned above, experimental data show that when the ratio of the volume to be diverted is less than 30%, the mixture will have an air/fuel ratio of about 20, and accordingly without taking any positive method to adjust the air/fuel ratio of a specified valve, the right temperature for reformation to be explained later will be attained.

In this manner, a blend of the air/fuel mixture and the burnt gas flows into the catalyst chamber 19, where reaction takes place with the catalyst, and the fuel, with one part of it reformed into a blend of decomposition and oxidation products, can be supplied to the combustion chamber of cylinder 4.

To illustrate an example with pertinent numerical data given, assuming the apparent air/fuel ratio of the mixture prepared in the auxiliary carburetor 5 to be 3, and the opening area ratio to be 1:3, a blend with air/fuel being less than 3 flows from the tube 9 into the heat-conducting tubes 10. About 25 percent of a lean mixture with an air/fuel ratio of approximately 20 flows into the reformer combustion chamber 14, to be ignited by the igniter 13 and completely burned, the burning flame thereby heating the heat-conducting pipes 10 within the reformer combustion chamber 14. The air/fuel ratio of the above lean mixture decreases as low as approximately 13, when the absolute value of the manifold vacuum becames very high during such times as idling or engine brake operation. Thus, the liquid phase fuel flowing together with air in the heat-conducting pipes 10 is gradually vaporized to become a gaseous phase in the mixture.

The mixtures after converging in the mixing chamber 17 attain a temperature of 200°–400°C and thus the reaction temperature of 150°–500°C which is necessary for reformation in the catalyst chamber 19 can be maintained.

As described above, according to the present invention, a definite proportion of a lean part, where the air/fuel ratio is approximately 20, in the fuel flowing from the fuel tank into the auxiliary suction pipe 6 is picked up to be burned, the high heat of its combustion being utilized for heating up the fuel within the heat-conducting pipes 10, so that the fuel can be perfectly vaporized, and the converging fuel flowing from two paths can within the mixing chamber 17 be maintained hot enough, or between 150° and 500°C, for reformation.

In the present invention, therefore, depending on the size of the opening 21 formed between the inner tube 9 and the reformer combustion chamber 14, the reforming conditions, such as the flow rate of the lean fuel flowing through the opening 21 into the outer tube 8, the temperature in the combustion chamber 14, the temperature of the blend of the mixtures from the two paths and the burnt gas can be appropriately set, and these conditions can be chosen to match the fuel to be used, by making the opening 21 variable in size.

Thus, the present invention can remarkably improve the ignition and combustion in an internal combustion engine by diverting and reforming a part of the fuel, particularly its lean part, from the fuel path, utilizing the heat of perfect burning of that part for reaction with a catalyst, and thereby reforming the fuel to be supplied to the cylinder.

Obviously, many modifications and variations of the present invention are possible in light of these teachings. It is to be understood therefore that within the scope of the appended claims, the invention may be practiced otherwise than as specifically disclosed herein.

What is claimed as new and desired to be secured by Letters Patent of the U.S. is:

1. A method for supplying combustible material to an internal combustion engine comprising the steps of:
   feeding a first portion of fuel and a first portion of air to a fuel reformer;
   diverting a part of said first portion of fuel and said first portion of air into a separate path within said fuel reformer;
   burning at least a portion of said part of said first portion of fuel to form combustion products and utilizing the heat of said burning to heat up and vaporize the remaining part of said first portion of fuel and to reform said first portion of fuel into a mixture including decomposition and oxidation products; and
   introducing said mixture including decomposition and oxidation products as well as a second portion of fuel which has not been reformed and a second portion of air into a combustion chamber of the engine.

2. The method of claim 1, wherein said first portion of said fuel is reformed into said mixture including decomposition and oxidation products in the presence of a catalyst.

3. The method of claim 1, further comprising the step of:
   converging said remaining part of said first portion of fuel with said combustion products to reform said first portion of said fuel into a mixture including decomposition and oxidation products prior to introducing said mixture into said combustion chamber of the engine.

4. The method of claim 3, further comprising the step of introducing said mixture including decomposition and oxidation products to a catalyst.

5. A device for supplying combustible material to an internal combustion engine comprising:
   a first fuel and air supply system connected to a combustion chamber of said internal combustion engine;
   a second fuel and air supply system for supplying a fuel-air mixture;
   a fuel reformer connected to said second fuel and air supply system; and
   a conduit for connecting said fuel reformer to said combustion chamber of said internal combustion engine;
   said fuel reformer comprising:
   a first and a second passage each connected to said second fuel and air supply system, a portion of said fuel and air entering into said first passage and the remaining portion entering into said second passage, said second passage being in heat exchange relation with said first passage; an igniter in said first passage for igniting said portion of said fuel and air and thereby heating said remaining portion in said second passage; and
   a plenum chamber connected to said first and said second passage for forming a confluence of said first passage and said second passage, said plenum chamber being connected to said conduit.

6. A device as set forth in claim 5, further comprising a catalyst interposed between said plenum chamber and said conduit.

7. A device as set forth in claim 5, wherein said second passage comprises:
   an inlet chamber connected to said second fuel and air supply system; and
   at least one heat-conducting pipe connected at one end thereof to said inlet chamber and at the other end thereof to said plenum chamber; and
   wherein said first passage comprises an outer shell connected at one end thereof to said inlet chamber and at the other end thereof to said plenum chamber and enclosing said inlet chamber and said heat-conducting pipe; and
   at least one partition disposed in said outer shell and dividing said outer shell into at least two sections, said sections communicating with each other, said inlet chamber having an opening whereby said inlet chamber is in communication with said outer shell; and
   wherein said igniter is disposed within one of said sections.

8. A device as set forth in claim 7, wherein said reformer further comprises a backfire preventing screen disposed between said igniter and said opening, said opening and said one of said sections wherein said igniter is disposed communicating only through said screen.

* * * * *